May 16, 1950     G. A. CUMMINS     2,507,772
SECTIONAL FISHING LURE
Filed Dec. 15, 1948
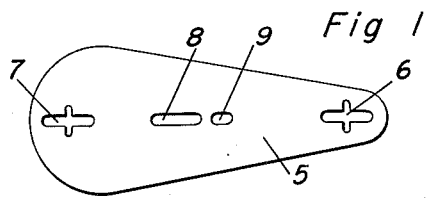
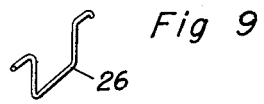
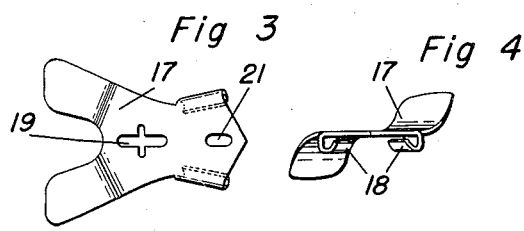
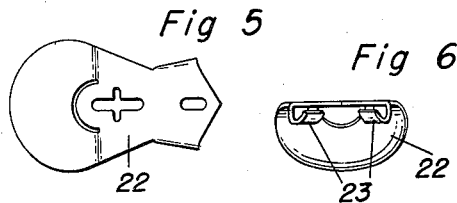
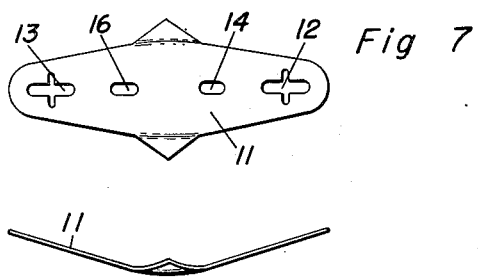
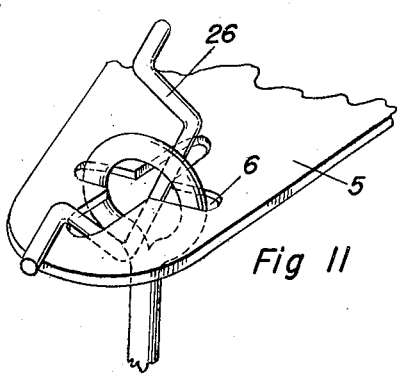
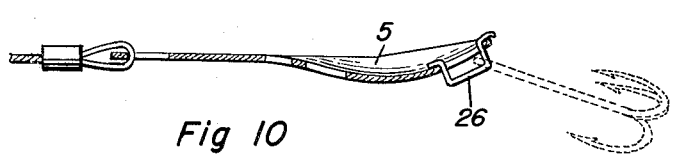
INVENTOR.
George A. Cummins
BY
C. L. ―――
Att'y Patented May 16, 1950

2,507,772

UNITED STATES PATENT OFFICE 2,507,772

SECTIONAL FISHING LURE

George A. Cummins, San Francisco, Calif.

Application December 15, 1948, Serial No. 65,315

2 Claims. (Cl. 43—42.5)

This invention relates to improvements in fishing lures and has particular reference to a sectional fishing lure; that is, one which is made up of one or more units which, when combined together in different manners, create different lure values or combinations.

The principal object of this invention is to produce a lure wherein a plurality of unit parts may be carried by a fisherman and combined in different manners to produce different effects, thus eliminating the necessity of carrying a large number of different lures.

A further object is to produce a device of this character which may be quickly assembled or dissembled, as conditions may demand.

A further object is to produce a lure which may become a spoon-type lure or a spinner-type lure.

Other objects and advantages will be apparent during the course of the following description.

In the accompanying drawings, forming a part of this specification and in which like numerals are employed to designate like parts throughout the same, Fig. 1 is a top-plan view of the lure body, Fig. 2 is a side elevation of Fig. 1, Fig. 3 is a top-plan view of a split tail unit, Fig. 4 is an end elevation of Fig. 3 looking from the right of the drawing, Fig. 5 is a modified form of another tail unit, Fig. 6 is an end elevation of Fig. 5, looking from the right of the drawing, Fig. 7 is a top-plan view of a modified form of lure body, Fig. 8 is a side elevation of Fig. 7, Fig. 9 is a perspective view of a form of connecting link used herein, Fig. 10 is a side elevation, partly in cross section, showing the manner of attaching a hook to the lower body through the use of one of the connecting links, Fig. 11 is a fragmentary perspective view, on an enlarged scale, showing the manner of attaching a hook to the body, using one of the connecting links.

The ordinary fisherman usually carries lures in his equipment, which lures may take different forms, the theory being that some lures will attract fish under certain conditions both as to appearance and movement in the water and, in order to attract the fish, the fisherman is constantly changing from one lure to another until he determines the one which is particularly suited for the locality being fished at the time, which condition may change with the change in light condition, and then the fisherman again changes to a different type lure, the result being that the fisherman has to carry considerable equipment which is bulky as well as expensive.

Applicant has, therefore, devised a sectional lure which comprises various parts which may be quickly attached, one to the other, in such a manner as to produce almost any type of lure, such as a spinner, a wiggler, a wobbler, or a spoon effect, to which the line and hooks may also be attached, as will be hereinafter seen.

Referring, now, to the accompanying drawings, wherein, for the purpose of illustration, is shown a preferred embodiment of my invention, in Fig. 1 I have shown a body portion which, in this particular instance, is spoon-shaped and tapered from end to end, the body being designated by the numeral 5.

In each end I have provided cross-shaped openings, as shown at 6 and 7, and also openings 8 and 9.

In Fig. 7 I have shown a modified form of body 11, which also has cross-shaped openings, as shown at 12 and 13, which correspond to the openings 6 and 7 respectively, and I have also provided openings 14 and 16, which correspond to the openings 8 and 9.

In Fig. 3 I have shown a split tail unit 17, which has curved portions 18, which are adapted to engage the body 5, as will be later described. This split tail also has a cross-shaped opening 19, formed therethrough, as well as an opening 21.

In Fig. 5 I have shown a fan tail piece 22, which has curved portions 23, similar to the curved portions 18. The forms shown in Figs. 3 and 5 may, in certain instances, be used as complete lure bodies.

The connecting link 26 serves the purpose of securing a hook to the lure, if desired.

The cross opening in the body members permits the head of a hook to be inserted therethrough, as shown in Fig. 11, after which the connecting member is placed through the eye of a hook and the hook eye pulled downwardly through the body, thus making a connecting means of attaching the hook or the hook and other units. As these connecting links are snapped into place they will be retained until forcibly snapped out of place.

It is, of course, understood that the openings in the tail units will coincide with the openings in the body portions when they are slipped thereonto.

It will thus be apparent that, with my body and unit parts, variable combinations may be assembled and dissembled so as to suit the wishes of the user.

It is to be understood that the form of my invention herewith shown and described is to be taken as a preferred example of the same and that various changes relative to the material, size, shape and arrangement of parts may be resorted to without departing from the spirit of the invention or the scope of the subjoined claims.

Having thus described my invention, I claim:

1. In a fishing lure, an elongated spoon shaped body having a cross-shaped opening at its rear end, two of the arms of said opening extending longitudinally of said body and the other arms of the opening extending transverse the body, a hook having an eye, and a hook connecting link for attaching said hook consisting of a wire having its central portion bent to U-shape to provide a pair of arms spaced to fit closely between the remote ends of the longitudinally extending arms of said opening, and angular projections on said wire at the ends thereof engaging in use with one side of said body upon the central portion of the connecting link extending through the opening.

2. In a fishing lure, an elongated spoon shaped body having a cross-shaped opening at its rear end, two of the arms of said opening extending longitudinally of said body and the other arms of the opening extending transverse the body, a hook having an eye, and a hook connecting link for attaching said hook consisting of a wire having its central portion bent to U-shape to provide a pair of arms spaced to fit closely between the remote ends of the longitudinally extending arms of said opening, and angular projections on said wire at the ends thereof engaging in use with one side of said body upon the central portion of the connecting link extending through the opening, the distance between the remote ends of the transverse arms being sufficient to permit passage of the hook eye therethrough.

GEORGE A. CUMMINS.

REFERENCES CITED

The following references are of record in the file of this patent:

UNITED STATES PATENTS

| Number | Name | Date |
|---|---|---|
| 123,844 | Sinclair | Feb. 20, 1872 |
| 1,270,033 | Knowles | June 18, 1918 |
| 1,309,061 | Cassedy | July 8, 1919 |
| 1,833,581 | Jordan | Nov. 24, 1931 |
| 2,003,976 | Raymond | June 4, 1935 |
| 2,238,604 | Sabin | Apr. 15, 1941 |
| 2,313,572 | Nungesser | Mar. 9, 1943 |
| 2,419,753 | Adair | Apr. 29, 1947 |